Jan. 14, 1941.  O. L. WOOD  2,228,938
ELASTIC FLUID GENERATOR
Filed July 26, 1938
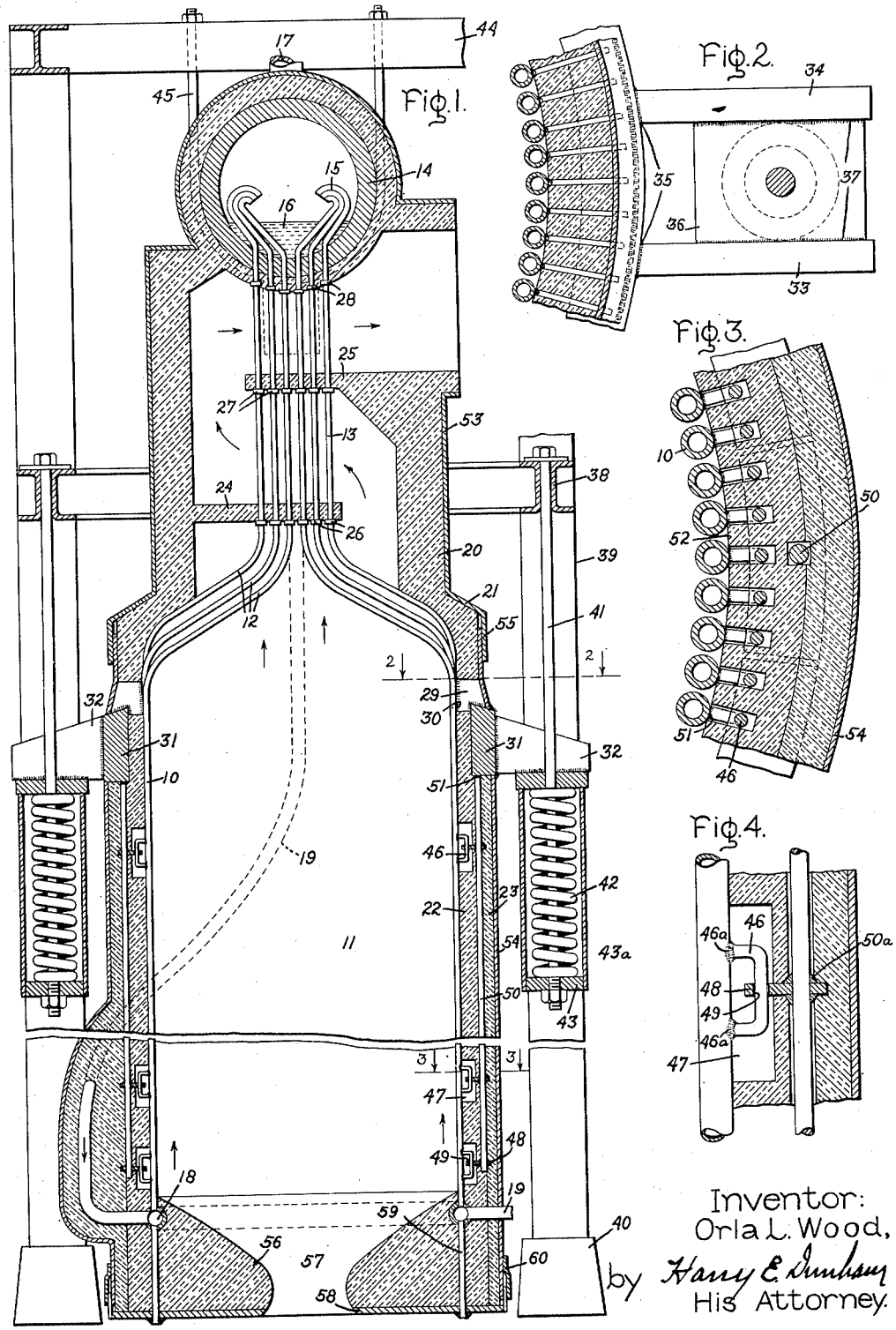
Inventor:
Orla L. Wood,
by Harry E. Dunham
His Attorney.

Patented Jan. 14, 1941

2,228,938

UNITED STATES PATENT OFFICE 2,228,938

ELASTIC FLUID GENERATOR

Orla L. Wood, Schenectady, N. Y., assignor to General Electric Company, a corporation of New York Application July 26, 1938, Serial No. 221,315

5 Claims. (Cl. 122—235)

The present invention relates to elastic fluid generators or boilers in which fluid is heated in tubes lining the wall of a heating chamber or furnace. More particularly, the invention relates to generators in which fluid is heated to high temperatures of the order of 1000° F., as is the case in mercury boilers. These high temperatures cause considerable expansion of the heating tubes and relative movement between them and the walls of the heating chamber adjacent thereto. The relative movement between the heating tubes and the walls necessitates the provision of special means for supporting both the tubes and the walls and for guiding the tubes and maintaining their relative position during operation.

The object of my invention is to provide an improved construction and arrangement of elastic fluid generators of the type above specified whereby heating tubes lining the walls of a heating chamber are free to expand relative to the insulating wall of the chamber and are retained in their proper relative positions.

For a consideration of what I believe to be novel and my invention, attention is directed to the following description and the claims appended thereto in connection with the accompanying drawing.

In the drawing Fig. 1 illustrates a mercury boiler embodying my invention; Fig. 2 is an enlarged section along the line 2—2 of Fig. 1; and Fig. 3 is an enlarged section along the line 3—3 of Fig. 1; and Fig. 4 is an enlarged view of a part of Fig. 1.

The arrangement comprises an annular row of heating tubes 10 defining a combustion chamber 11. Intermediate portions 12 of the tubes are curved inward towards the center of the chamber and spaced to permit the discharge of combustion gases. Upper portions 13 of the tubes form several parallel rows connected at their upper ends to a vessel or drum 14. Each tube has an extension 15 with a downwardly curved end portion located within the drum to effect discharge of heated fluid in downward direction within the drum, that is, towards a pool 16 of mercury formed in the drum and thereby to minimize the discharge of liquid particles through a discharge conduit 17 connected to the drum 14. The lower ends of the tubes 10 are connected to a lower header 18 to which mercury liquid is supplied by downcomers 19 connected between the headers 18 and the drum 14. The heating tubes and the drum are surrounded by a wall or walls 20 of heat-insulating and heat-resistant material and these walls are enclosed by a sheet metal casing 21. The lower portion of the wall 20 may consist of several layers or sections 22, 23 of different kinds of heat-resistance and heat-insulating material, as is common in boiler practice. The lower or straight portions of the tubes 10 forming the combustion chamber 11 are substantially vertically arranged and line the walls 20 while the upper portions 13 of the heating tubes are disposed centrally within the space defined by the walls 20. A boiler of this general type is disclosed in the copending application of W. L. R. Emmet, Serial No. 22,119, filed May 17, 1935, and assigned to the same assignee as the present application.

During operation, mercury liquid is conducted through the down-tubes 19 to the lower headers 18, whence it flows up through the up-tubes 10 and is partly evaporated, the mixture of liquid and vapor being discharged through the curved extensions 15. The liquid thus discharged is recirculated and the vapor is discharged through the vapor conduit 17.

The heating in the chamber 11 takes place primarily by radiation, whereas the heating of the upper straight portions 13 of the tubes takes place primarily by convection. In order to provide a circuitous path for the combustion gases leaving the chamber 11 and to cause these gases to flow across the upper tube portions 13, baffles 24 and 25 are connected to opposite portions of the wall 20 and made of heat-resistant material. Portions of these baffles are supported on spaced colairs 26 and 27 formed on the upper tube portions 13. The bottom portion of the drum 14 is also covered by heat-insulating material which is partly supported by means of collars 28 welded to the tube portions 13.

During operation, mercury is heated in the tubes 10 at temperatures of the order of 1000° F. This, as stated before, requires special supporting means of the tubes and the walls, permitting relative expansion between them. In the present arrangement each tube is provided with a laterally extending supporting lug 29 near the upper end of the combustion chamber. These lugs extend radially outward into the wall 20 and are secured to the tubes by welds 30. Thus the annular row of tubes is provided with a plurality of separate supporting lugs welded to the back of the tubes (Fig. 2). The lugs rest on a supporting member or ring 31 partly embedded in the insulating wall 20 and having an outer cylindrical surface with four uniformly spaced projections 32, each projection including two side walls 33 and 34 secured to the supporting ring 31 by welds 35 and a bottom plate 36 secured to the walls 33, 34 by welds 37. The supporting ring 31 with the projections 32 are yieldingly held on a fixed support. The fixed support includes horizontal beams 38 secured to vertical beams 39, which latter rest on a foundation 40. The connection between the beam structure and the projections 32 comprises vertical rods 41 held at their upper end on the beams 38 and compression springs 42 surrounding the lower portions of the rods 41 and engaging at their upper ends the bottom plates 36 and at their lower ends end plates or washers 43 held on the rods. Each spring 42 is enclosed in a casing 43a welded at its upper end to the bottom plate 36. With this arrangement the tube structure, particularly the portions of the tubes lining the wall in the combustion space, is yieldingly supported by means external the boiler wall. The upper tube portions 13 are supported on the drum, which latter is held on upper beams 44 by means of U-shaped links 45. With the support of the tubes on the drum and near the upper end of the combustion chamber, the shape of the curved tube portions 12 and the spacing of these portions is maintained during operation. In other words, the support of the vertical tubes lining the combustion chamber near the upper end thereof prevents the vertical tubes from exerting downwardly directed forces on the curved tube portions 12.

As shown in Figs. 2 and 3 the tubes are slightly spaced circumferentially. It is important to maintain this spacing and also to prevent the tubes from curving inward towards the combustion chamber during operation in order to effect uniform heating of the tubes and to prevent burning of the walls 20. This is accomplished according to my invention by the provision of means for guiding the tubes on the wall 20. This means, as will be seen presently, also serves to support the walls 20 on the supporting ring 31. Each tube is provided with several vertically spaced guiding lugs 46, each lug being in the form of a U-shaped member with the legs thereof secured to the tube by welds 46a and the base disposed vertically in a corresponding recess 47. Embedded in the wall 20 and projecting into the recesses 47 thus formed are several vertically spaced rings 48. The U-shaped guide lugs, more specifically the vertical base portions thereof, project through openings 49 in said rings (Fig. 4). The vertically spaced rings are fastened to vertical supporting rods 50 by welds 50a. The rods have upper ends united with the supporting ring 31 by means of welds 51. The supporting rods 50 with the rings 48 serve to guide the tubes 10 in the combustion space and to support the wall 20. Thus the rings 48 constitute both guide members for the tubes 10 and supporting members for the wall 20. The rods 50 are substantially surrounded by the insulating wall but slightly spaced therefrom to permit relative expansion between the material of the wall and the rods.

As stated above, each guiding lug 46 is located in a recess 47. The circumferential width of the recess is only slightly greater than the thickness of the lug 46. Adjacent recesses are separated by heat resistant wall portions 52. These wall portions 52 form stops for the guide lugs 46, permitting only slight circumferential movement of the guide lugs and the tubes fastened thereto relative to the wall 20. Thus the circumferential spacing of the tubes will be maintained during operation by the stops formed by wall portions 52 intermediate adjacent recesses. The outer surface of the wall 20 is enclosed by the sheet metal casing 21 which comprises an upper portion 53 surrounding the upper portion of the wall 20 and the drum 14 and a lower portion 54 surrounding the wall of the combustion chamber 11 and welded to the supporting ring 31. The upper end of the casing portion 54 forms a sliding joint 55 with the lower end of the casing portion 53. With this arrangement the outer casing is free to expand relative to the insulating wall 20 and also relative to the heating tubes 10. The heating tubes 10, the wall 20 and the lower casing portion 54 for the combustion chamber have a common supporting means including the supporting ring 31.

As stated above, means are provided to limit circumferential relative movement between the tubes and to guide the tubes along the wall, thereby reducing the tendency of the tubes to curve inward towards the combustion space and preventing excessive stresses from being set up in the tubes. As an additional means to maintain the tubes taut and in vertical alinement, the boiler has a lower bottom wall or casing portion separate from the walls 20 and hung or supported on the lower ends of the tubes. The bottom 56 forms an opening 57 for the supply of fuel and air and is supported on an end or bottom plate 58. The latter is held on a plurality of rods 59 having lower portions welded to the plate 58 and upper portions welded to the annular header 18, the latter being embedded in the bottom wall 56. With this arrangement the bottom wall may move vertically relative to the side wall 20 and be supported substantially entirely on the lower ends of the tubes 10. The latter will maintain their vertical position during operation. Means forming a sliding joint 60 are provided to seal the outer casing 54 against the bottom wall in order to prevent leakage of air into the combustion chamber. Certain features of the arrangement described above form a part of the application of W. L. R. Emmet, Serial No. 215,827, filed on June 25, 1938, and assigned to the same assignee as the present application.

What I claim as new and desire to secure by Letters Patent of the United States is:

1. A boiler comprising a wall, a plurality of vertical heating tubes lining the wall, and means slidably guiding the tubes on the wall and permitting movement of the tubes relative to the wall and relative to each other comprising a plurality of vertically spaced members rigidly secured to each tube, each member having a portion spaced from the tube and parallel thereto, other members rigidly fastened to the wall each other member having an opening through which said portion slidably extends, and a support for the upper ends of the tubes whereby the weight of the tubes keeps them taut.

2. A boiler comprising a wall forming a combustion space and having a recess on the combustion side, a plurality of substantially parallel, vertically arranged heating tubes lining the wall on the combustion side, each tube having a U-shaped member with legs fused to the tube and a base spaced from and extending parallel to the tube, the U-shaped members being disposed within the recess, and a member partly embedded in the wall and having a portion with a plurality of openings projecting into the recess, the base portions of the U-shaped members projecting through the openings and forming small clearances therewith to guide the tubes and to permit relative movement between the individual tubes and to prevent them from moving away from the wall during operation, and a support for the upper ends of the tubes whereby the weight of the tubes keeps them taut.

3. A boiler including the combination of walls forming a chamber, a row of heating tubes lining the wall in the chamber and means for supporting the tubes and the wall and permitting relative movement between them, said means comprising a supporting member, lugs welded to upper portions of the tubes and engaging the supporting member, vertical rods secured to the supporting member and vertically spaced plates secured to the rods and having portions embedded in the wall.

4. A boiler including the combination of walls forming a heating chamber, a row of vertical heating tubes lining the wall of the chamber and means slidably guiding the tubes and permitting relative vertical movement between them and the wall, said means comprising a plurality of vertical rods enclosed in the wall, a support for the rods, vertically spaced plates secured to the rods and a plurality of vertically spaced guide members secured to the tubes and slidably engaging the plates.

5. A boiler including the combination of walls forming a heating chamber, a row of vertical heating tubes lining the wall of the chamber and means guiding the tubes and permitting relative movement between them and the wall, said means comprising a plurality of vertical rods, a support for the upper ends of the rods with their lower ends free to expand downward, vertically spaced plates secured to the rods and a plurality of vertically spaced guide members secured to the tubes and engaging the plates, the wall adjacent the heating tubes having recesses for the guide members and forming portions intermediate adjacent recesses to limit lateral movement of the heating tubes.

ORLA L. WOOD.